United States Patent [19]
Berg et al.

[11] Patent Number: 5,599,597
[45] Date of Patent: Feb. 4, 1997

[54] CONCRETE MOLDING WITH IMPROVED ACID RESISTANCE

[75] Inventors: Volkmar Berg, Graben; Helmut Rinno, Hofheim, both of Germany

[73] Assignee: Hoechst Aktiengesellschaft, Germany

[21] Appl. No.: 358,337

[22] Filed: Dec. 16, 1994

Related U.S. Application Data

[63] Continuation of Ser. No. 045,559, Apr. 9, 1993, abandoned.

[30] Foreign Application Priority Data

Apr. 13, 1992 [DE] Germany ............................ 42 12 325.9

[51] Int. Cl.⁶ ..................................................... B32B 27/00
[52] U.S. Cl. ..................... 428/344; 428/500; 138/DIG. 7; 138/172; 138/175
[58] Field of Search ................................ 428/34.4, 500; 138/172, 175, DIG. 7; 106/638, 739, 90; 118/105, 125; 425/110, 460

[56] References Cited

FOREIGN PATENT DOCUMENTS

| 0069586 | 1/1983 | European Pat. Off. . |
|---|---|---|
| 0190353 | 8/1986 | European Pat. Off. . |
| 2741245 | 3/1979 | Germany . |
| 8303891 | 11/1983 | Netherlands . |
| 1388349 | 5/1975 | United Kingdom . |
| 1407827 | 9/1975 | United Kingdom . |
| 2071523 | 9/1981 | United Kingdom . |

OTHER PUBLICATIONS

Copy of Search Report (5 pages).
PCT/DK90/00051 of 2/22/90 –WO 90/10606.

*Primary Examiner*—Charles Nold
*Attorney, Agent, or Firm*—Bierman and Muserlian

[57] ABSTRACT

Unreinforced or reinforced concrete moldings, for example concrete pipes, with improved corrosion resistance to acids and acidic sewage, improved permeation resistance to inorganic and organic liquids and gases and improved mechanical stability, produced by molding with machines, for example in press molding machines or extrusion machines or concrete pipe pressing machines, and allowing to harden plastic-viscous concrete mixtures of hydraulic inorganic binders, preferably cement, aggregates and water, where, in the preparation of the plastic-viscous concrete mixtures, to the latter has been added in a positive mixer an effective amount of an aqueous plastics dispersion based on anionic and hydrolysis-resistant copolymers of ethylenically unsaturated monomers, the minimum film forming temperature (MFT) of which is above the setting temperature of the concrete mixture, preferably above 23° C. Use of the concrete moldings as concrete precast parts for many various applications, preferably as construction elements in building construction, road building, bridge building, civil engineering, in particular in sewage pipeline construction for underground sewer lines and service water lines.

8 Claims, No Drawings

CONCRETE MOLDING WITH IMPROVED ACID RESISTANCE

PRIOR APPLICATION

This application is a continuation of U.S. patent application Ser. No. 045,559 filed Apr. 9, 1993, now abandoned.

The invention relates to concrete moldings having improved resistance to acidic aqueous liquids and to processes for producing the former from hydraulic binders and aggregates, also using aqueous plastics dispersions.

In recent years damage to concrete surfaces exposed to the weather and to underground sewer pipes has become known to an increasing extent. The causes of the damage result principally from the increased corrosiveness of the precipitated water, ambient air and sewage and in the case of sewer pipes additionally by increased external compressive loading as a result of the greatly increased heavy duty road traffic.

A possible improvement in the resistance of sewer pipes to the increased corrosiveness of sewage might be seen, for example, in the use of stoneware pipes. However, these pipes, which are available in particular in small diameters, are renowned for their susceptibility to fracture and their low mechanical strength and it is not infrequently the case that they are damaged by external effects even during transport to the construction site and thereby become unserviceable. Their external compression resistance after laying is also unsatisfactory and their usability in the case of effects to be expected from heavy duty traffic is therefore considerably restricted or requires additional safeguarding measures. In the case of other exposed concrete precast elements or concrete moldings, such as, for example, structural concrete construction elements or exposed facades, protective coats and top coats can in many cases be temporarily useful, although, for example, in the case of fair-faced concrete surfaces, the frequently desirable original appearance of structured concrete is lost due to top coats.

Cement-bound concrete pipes, which are proven in practice because of their mechanical robustness and are in use up to very large diameters, have, as is known, in the recent past frequently been found to be not chemically stable and, as a result of corrosion damage, therefore lead ever more frequently to environmental problems and to losses. An improvement in the corrosion resistance of concrete pipes can frequently by achieved retrospectively by lining or coating the interior surface with plastics, for which various materials and processes are available. Pulling in so-called inliners also provides an interesting possibility for repairing damaged concrete pipes laid underground without having to dig up the pipes. The prerequisite for this is that the concrete body of the lined concrete pipes can continue to support mechanical loads. The problem with this, however, is the repair of lateral junctions and connections to buildings, and it has also been found recently that sewage migrates behind the inliner pipes and the concrete corrosion then continues or, in the case of new concrete pipes, commences behind the inliner pipes or behind the coating. The inliner process and the interior coating of sewer pipes also provide no solution for the external protection of concrete pipes which is frequently necessary.

Sewer pipes with particular chemical and mechanical resistance can, as is known, be made from epoxy concrete. However, these pipes have inter alia the serious disadvantage of very high purchase costs which, for comparison, are approximately ten times those of concrete pipes.

In the production of cement-bound concrete pipes, there is the possibility of modifying the concrete by the addition of aqueous plastics dispersions. Here, the modification can include the entire pipe wall thickness or be limited only to inner or to inner and outer auxilliary layers. However, it has been found here that when commercial, so-called construction material dispersions based on copolymers of ethylenically unsaturated monomers, in particular on acrylate copolymers having a minimum film forming temperature (MFT) in the region of or below ambient temperature, preferably between 0° and 15° C., the acid resistance of concrete can virtually not be improved. With the use of these construction material dispersions as concrete improving agents in the production of cement-bound concrete pipes using machines, for example in vibrating press molds or roller press molds, these dispersions further affect the internal viscosity of the plastic-viscous concrete mixture to such a degree that its solidification or setting time and thus the required residence time in the pipe press mold is extended until stripping. This impairs, in particular, the desired immediate attainment of the inherent stability of the stripped wet concrete pipe blank, leading to longer cycle times for the concrete pipe pressing machines and thus to losses.

The present invention was thus based on the object of making available a concrete improving agent in the form of an aqueous plastics dispersion which makes possible the production of concrete moldings bound by hydraulic binders, preferably concrete pipes, having improved acid resistance and in addition at least does not extend or, through more rapid stabilization of the wet concrete moldings or concrete pipe blanks, further reduces the cycle times as far as possible up to the dimensionally stable stripping of the wet concrete moldings and does not disadvantageously affect the rheological behavior of the plastic-viscous concrete mixture.

It has now been found surprisingly that the above object can be achieved in that, in the production of concrete mixtures which contain hydraulic binders and can be used for producing unreinforced or reinforced concrete moldings, preferably concrete pipes, aqueous plastics dispersions based on anionic and hydrolysis-resistant copolymers of ethylenically unsaturated monomers whose minimum film forming temperature (MFT) is above the setting temperature of the concrete mixture are added to the concrete mixtures.

The invention therefore relates to molded unreinforced or reinforced concrete moldings, preferably concrete pipes, bound by hydraulic inorganic binders, with improved corrosion resistance to acids and acidic sewage, improved penetration resistance to inorganic and organic liquids and gases and improved mechanical stability, which have been produced by molding and hardening of plastic-viscous concrete mixtures of hydraulic inorganic binders, preferably cement, aggregates and water, which additionally contain finely distributed plastics components from anionic dispersion copolymers which have been prepared from ethylenically unsaturated monomers by copolymerization, are hydrolysis resistant with respect to the hydraulic inorganic binder and with respect to acidic sewage and have been mixed with the plastic-viscous concrete mixtures as an aqueous plastics dispersion which is compatible with the hydraulic inorganic binder and whose minimum film forming temperature (MFT) is above the hardening temperature of the plastic-viscous concrete mixtures, preferably between 23° and 100° C., in particular between 30° and 50° C.; the glass transition temperature ($T_g$) of the anionic dispersion copolymer is preferably higher than 23° C., in particular higher than 30° C., and the anionic dispersion copolymer contains, in each case based on the dispersion copolymer, preferably 0.05 to 5% by weight, in particular 0.01 to 2.5% by weight, of monomer units from the group of ethylenically unsaturated carboxylic acids, ethylenically unsaturated sulfonic acids, ethylenically unsaturated phosphonic acids and, if appropriate, preferably up to 2% by weight, in particular 0.01 to 0.5% by weight, of monomer units from ethylenically unsaturated monomers with organosilicon radicals, which may be reactive, or contains epoxy-silanes mixed with the aqueous plastics dispersion.

The content of anionic dispersion copolymer in the plastic-viscous concrete mixtures is variable and can be adapted to requirements. It is preferably 2.5 to 25% by weight, in particular 5 to 15% by weight, based on the amount of the hydraulic inorganic binder, preferably cement, in particular Portland cement, contained in the plastic-viscous concrete mixtures. The addition of the anionic dispersion copolymers takes place in the form of their aqueous dispersions, the solids content of which is not critical and is preferably 2 to 70% by weight, in particular 20 to 50% by weight, based on the dispersion. The proportion of water in the dispersions has, in its entire amount in the concrete formulation, to be considered as mixing water.

The anionic dispersion copolymers preferably used are (meth)acrylic ester copolymers and (meth)acrylic ester/styrene copolymers, the copolymers having to contain in addition anionic comonomer units of ethylenically unsaturated carboxylic acids, ethylenically unsaturated sulfonic acids or ethylenically unsaturated phosphonic acids, preferably a plurality of these anionic monomer units, and the glass transition temperature ($T_g$) of these anionic dispersion copolymers being preferably above 23° C. Anionic dispersion copolymers containing monomer units of vinyl esters, preferably vinyl acetate, vinyl propionate and vinyl Versatate, vinyl chloride, ethylene and mono- or diesters of ethylenically unsaturated dicarboxylic acids, preferably maleates or fumarates, can also in some cases be advantageous or be advantageously contained proportionally in the plastics dispersions to be used according to the invention if they, inter alia, can fulfill the particular requirements for hydrolysis resistance. The comonomer units of (meth)acrylates which come into consideration are preferably ($C_1$–$C_{18}$)alkyl (meth)acrylates, with the choice of the individual comonomers to be made, inter alia, such that the $T_g$ of the anionic dispersion comonomer to be used is above 23° C. The monomers or monomer mixtures are chosen such that plastics dispersions based on homopolymers or copolymers with an MFT which is above 23° C., preferably between 23° and 100° C., in particular between 30° and 50° C., result. From the $T_g$ of the polymers (see Polymer Handbook by J. Brandrup, H. E. Immergut, John Wiley and Sons, Inc., New York (1975)) and the polymerization parameters, it is obvious to a person skilled in the art which monomers or mixtures of monomers have to be used for this.

Anionic comonomer units which come into consideration are preferably acrylic acid, methacrylic acid, vinylsulfonic acid, (meth)acrylamidopropanesulfonic acid, vinylphosphonic acid and vinylbenzenesulfonic acid. Preferably anionic dispersion copolymers containing a plurality of different anionic comonomer units are used. The anionic dispersion copolymers can according to the invention preferably also contain comonomer units of ethylenically unsaturated monomers with organosilicon radicals, which may be reactive, or epoxysilanes mixed with the aqueous plastics dispersion. Their proportion can be preferably up to 2% by weight, in particular 0.01 to 0.5% by weight, based on the anionic dispersion copolymer. Suitable comonomers are, for example, preferably vinylsilanes and vinylsiloxanes, such as are known, inter alia, from German Patent 2148457 and German Patent 2148458. The subsequent addition of, for example, epoxysilanes to the aqueous anionic copolymer dispersions can be advantageous. The anionic dispersion copolymers are used preferably as aqueous dispersions in the form of their salts with monovalent cations, preferably as alkali metal or ammonium salts, in particular as sodium salts or potassium salts. The preparation of the anionic dispersion copolymers to be used according to the invention in the form of aqueous dispersions can take place preferably by emulsion polymerization of the comonomers according to known methods, preferably with the additional use of anionic emulsifiers or of anionic and nonionic emulsifiers. However, they can also be prepared by appropriate other copolymerization methods and by converting the copolymers into an aqueous dispersion form. The aqueous plastics dispersions can also be prepared from redispersible dispersion copolymer powders, such as can be obtained, as is known, from aqueous plastics dispersions, for example by spray drying. For the use according to the invention, the anionic copolymer dispersions are adjusted in particular to a neutral to weakly alkaline pH, preferably to pH 7 to 8.5.

The plastics dispersions to be used according to the invention must, inter alia, be alkali resistant, shear stable and cement compatible and may not disadvantageously affect the cement hardening during the setting process of the concrete. The dispersions must furthermore preferably be low foaming or be adjusted so as to be low foaming or foam-free by the addition of foam inhibitors, so that the air pore content in the concrete prepared with their partial use and hardened preferably does not exceed the range from 1 to 10% by volume, in particular 1.5 to 4% by volume, based on the concrete (test according to DIN 1045 and 1048).

The plastics dispersions to be used according to the invention are preferably free of polymeric protective colloids, such as, for example, carboxymethylcellulose, hydroxyethylcellulose or polyvinyl alcohol, and preferably contain in addition to conventional low molecular weight anionic emulsifiers also conventional nonionic emulsifiers, such as are usually used, inter alia, in emulsion polymerization, for example alkylphenol polyglycol ethers.

Particularly preferred plastics dispersions are, for example, those based on copolymers, containing anionic monomer units, of acrylates and/or methacrylates, (meth)acrylates/vinylaromatics in particular styrene/(meth)acrylates, α-methylstyrene/(meth)acrylates and of styrene/butadiene/(meth)acrylates, which all have, inter alia, especially good hydrolysis resistances, furthermore of vinyl acetate/dialkyl maleates and of vinyl acetate/vinyl Versatate/ethylene.

Also particularly preferred, especially also because of their good hydrolysis resistance, are copolymers which are based on homologous ($C_1$–$C_{18}$)alkyl acrylates and homologous ($C_1$–$C_{18}$)alkyl methacrylates which are known in the specialist field as so-called pure acrylates or pure acrylate dispersions, and copolymers of these homologous monomers together with styrene, α-methyl styrene and, if appropriate, butadiene, preferably all the copolymers mentioned containing, if appropriate, in addition comonomer units of ethylenically unsaturated monomers with organosilicon radicals, which may be reactive, or epoxysilanes mixed with the aqueous plastics dispersions.

Especially suitable according to the invention are, for example, aqueous plastics dispersions based on anionic copolymers of the following comonomers:

a) 53–60 PBW of styrene,
b) 38–45 PBW of n-butyl acrylate,
c) 2–4 PBW of unsaturated carboxylic acids, preferably from the group comprising acrylic acid and methacrylic acid, where PBW=parts by weight, the sum of a)+b)+c) must result in 100 PBW of copolymer and these copolymers additionally contain, in each case based on 100 PBW of copolymer of a)+b)+c), d) 0–2% by weight, if appropriate preferably 0.5 to 1.5% by weight of ethylenically unsaturated comonomer units containing sulfonic acid groups or, if appropriate, phosphonic acid groups, preferably sulfonic acid groups, and
e) 0–2% by weight, if appropriate preferably 0.5 to 1.5% by weight, of ethylenically unsaturated comonomer units with organosilicon radicals, which may be reactive, or, as partial or complete replacement of the organosilicon comonomer units,
f) 0–2% by weight, if appropriate preferably 0.5 to 1.5% by weight, of epoxysilanes mixed with the aqueous plastics dispersions, the sum of e)+f), if appropriate, being at most 2% by weight.

The dispersions contain as emulsifiers preferably conventional anionic and in particular anionic and conventional nonionic surface active compounds in the quantities conventional for emulsion polymerizations.

Plastics dispersions according to the invention which are particularly preferred are, for example, those based on anionic copolymers with the following composition (PBW= parts by weight):

a) 53–56 PBW of styrene,
b) 40–43 PBW of n-butyl acrylate,
c) 2–3 PBW of acrylic acid and/or methacrylic acid,
d) 0.5–1.5 PBW of ethylenically unsaturated comonomers containing sulfonic acid groups,
e) 0–2 PBW, if appropriate preferably 0.5 to 1.5 PBW, of ethylenically unsaturated comonomers with organosilicon radicals, which may be reactive, or, as partial or complete replacement of the organosilicon comonomers,
f) 0–2 PBW, if appropriate preferably 0.5 to 1.5 PBW, of epoxysilanes mixed with the aqueous plastics dispersions, with the sum of a)+f) being preferably at most 2 PBW, and the plastics dispersions contain as emulsifiers, in each case based on the anionic copolymer,
0.3–2% by weight, preferably 0.5 to 1.5% by weight, in particular 0.6% by weight, of anionic emulsifiers, preferably emulsifiers containing sulfo groups, in particular alkali metal salts of sulfuric acid half-esters of oxyethylated alkylphenols, and
1–5% by weight, preferably 1.5–3% by weight, in particular 2% by weight, of nonionogenic emulsifiers, preferably alkylphenol polyglycol ethers, in particular nonylphenol polyglycol ethers or tributylphenol polyglycol ethers with preferably 15–50 ethylene oxide units,
and have a minimum film forming temperature (MFT) of $\geq 31°$ C.

Because of the contents according to the invention of comonomer units with organosilicon radicals in the anionic copolymers or because of the epoxysilanes mixed according to the invention with the aqueous plastics dispersions, with the use according to the invention of the plastics dispersions in concrete mixtures, the chemical resistance of the hardened concrete can be even further improved, which is important and advantageous in particular for the production of concrete sewer pipes.

Hydraulic binders which are suitable for use according to the invention are preferably all inorganic materials occurring in amorphous form which can react in a cement-like manner with water. All cement types which are provided in DIN 1164 are preferred, in particular blast furnace slag cement and Portland cement, and mixtures of these cement types with materials which can complement or improve the cement effect, preferably, for example, fly ashes from coal combustion processes or from the silicon preparation process.

Aggregates which are suitable for use according to the process are preferably all conventional mineral sands and gravels, crushed mineral grain mixtures, such as, for example, crusher sands, chippings and the ultrafine grain fractions thereof. Particularly preferred are all aggregates provided according to DIN 4032, 4034 and 4035. The choice of the grain sizes of the aggregates is made according to known specifications and criteria.

The proportion of water in the concrete mixtures depends on the respective component compositions and on the possibilities of compaction during the concrete molding. It is preferably approximately 30 to 50% by weight of water, based on the amount by weight of the hydraulic inorganic binder used, preferably cement, the proportion of water in the plastics dispersion being taken into account.

The plastics dispersions to be used according to the invention are suitable advantageously for the production using machines of unreinforced and of reinforced concrete moldings, in particular concrete pipes of all customary sizes, formats and dimensions, with the pipes being able to be shaped in, for example, a round, oval, rectangular or open shell-shaped, for example U-shaped, manner or as shaft tubes. Preferably pipes with bell-shaped ends are produced which are joined onto one another to form liquid-impermeable pipelines and can preferably be laid as such underground in particular as water conduits and sewer conduits or water pipelines and sewer pipelines, with for example the field of acid biological sewage, for example from the fermentation industry, lactic acid fermentation of agricultural feedstuffs or from biological water treatment plants, in addition to domestic and fecal sewage, taking on ever increasing importance.

The production of concrete pipes according to the invention with machines can be carried out preferably according to known standards, for example DIN 4032 for unreinforced pipes, DIN 4035 for reinforced pipes and DIN 4034 for shafts, according to known manufacturing techniques on known manufacturing machines, preferably by the vibrating press process or by the roller press process, as concrete precast parts.

The concrete moldings produced and hardened with the additional use of aqueous plastics dispersions according to the invention, and in particular the concrete pipes, have in addition to the sought-after, and already mentioned, surprisingly and unexpectedly greatly improved acid corrosion resistance and the greatly improved diffusion impermeability with respect to liquid inorganic and organic media and gases, whereby, for example in the case of sewer pipes, the penetration of substances posing a hazard to ground water into the ground can be reduced or prevented, significantly improved mechanical properties, in comparison to corresponding concrete pipes made without the addition of plastics dispersions according to the invention, such as, for example, an increased crushing load, an improved ring tensile strength in bending, a lower modulus of elasticity, an increased elongation at break and an increased water impermeability and increased impermeability to aromatic and aliphatic hydrocarbons and to halogen-substituted aromatic and aliphatic hydrocarbons. Furthermore, the carbonation of the finished concrete pipes during their subsequent service life is significantly reduced, which is of very particular importance in particular in the case of reinforced concrete pipes for long-term maintenance of the corrosion protection of the reinforcement, to which the greatly reduced formation of hair cracks in the reinforced concrete on account of an improved elasticity of the hardened concrete can also decisively contribute. The same advantageous properties are also possessed by all other concrete moldings produced according to the invention as concrete precast parts, preferably the concrete block moldings of all technically possible dimensions and shapes, with or without reinforcement, produced using press molding machines or extrusion machines. In addition to concrete sewer pipes and concrete sewer shaft pipes, in principle all concrete moldings which can be produced as concrete precast parts come into consideration here, preferably, for example, facade construction elements, prestressed concrete components, hall roof trusses, hall girders, bridge girders, railroad ties, floor and wall slabs of buildings and the structural, load-bearing building components thereof, roof structures, mineral oil storage tanks, prefabricated garages, prefabricated concrete air-raid shelters, radiation protection bunkers and combat protection bunkers, transportable catchment surfaces and bunds or collecting basins for hazardous, corrosive and environmentally polluting liquids, construction elements for swimming pools and firefighting water pools, sidewalk slabs and curbstones for road construction, composite paving stones, concrete roof tiles, U-shaped earthwork blocks, cover slabs, wheel load-bearing floor or carriageway slabs, slot channels and Birco channels.

The conventional attempts to add the aqueous plastics dispersions already used in mortar, concrete and screed production for improvement of the final products, which have become known in practice as so-called construction material dispersions, also to the concrete compositions for producing concrete pipes in order thereby, if appropriate, to obtain improvements of the concrete pipe properties did not achieve the desired result. These construction material dispersions have in general a low minimum film forming temperature (MFT) which is usually below 15° C. However, it has been found that when these construction material dispersions are used in conventional amounts as concrete improvement agents in the production of cement-bound concrete pipes with machines, for example in vibration press molds or roller press molds, although these dispersions can reduce, inter alia, the internal viscosity of plastic-viscous concrete mixtures, at the same time they disadvantageously affect the setting time of the concrete mixtures and also the time span until stabilization of the wet concrete pipe blanks after stripping, and in particular, inter alia, considerably increase said time span, which makes longer cycle times in the concrete pipe pressing machines necessary and thus leads to losses. Furthermore, the concrete pipes produced with the addition of construction material dispersions show virtually no improved surface corrosion resistance to aqueous acids and acid-containing sewage in comparison with corresponding concrete pipes which have been produced without the additional use of construction material dispersions.

It has now been found surprisingly that with the use of aqueous plastics dispersions which correspond to the previously described specifications for improving the acid corrosion resistance of concrete pipes according to the present invention as concrete improvement agents in the production of cement-bound concrete pipes and other concrete moldings using machines, the former can provide the plastic-viscous concrete mixtures produced therewith in a positive mixer with thixotropic properties which can have unexpectedly advantageous effects in production. Thus, the concrete mixture, when filled using machines into, for example, the concrete pipe molds with simultaneous mechanical compaction as a result of the shear forces acting on the mixture, can flow better, which has a time-saving or time-reducing effect on the concrete pipe mold filling process in comparison to corresponding plastics dispersion-free concrete mixtures. However, after termination of the effect of these shear forces, the concrete mixture rapidly loses its plasticity and immediately begins to harden, without disadvantageously affecting the cement setting behavior, so that the molded wet concrete pipe blank can be immediately stripped and is obtained with a dimensionally stable inherent stability, so that it can harden fully in a dimensionally stable manner. With this unexpectedly advantageous thixotropic influencing of the properties of the plastic-viscous concrete mixtures which is obtainable by the use of aqueous plastics dispersions according to the invention, surprisingly, in the production of concrete pipes using machines, very short cycle times in the concrete pipe pressing machines and thus an unexpectedly high production rate per unit time with simultaneously significantly improved concrete pipe quality can be obtained.

The invention therefore also relates to a process for producing unreinforced or reinforced concrete moldings, preferably concrete pipes, from aqueous moldable concrete mixtures containing conventional hydraulic inorganic binders, preferably cement, and conventional, preferably inorganic, aggregates with the production of plastic-viscous concrete mixtures in a positive mixer, shaping of the concrete moldings by means of press molding machines or extrusion machines and the concrete pipes preferably in a concrete pipe pressing machine, preferably by the vibration pressing process or the roller pressing process, and allowing the concrete to harden after stripping the wet concrete moldings or concrete pipe blanks, wherein an effective amount of an aqueous plastics dispersion which is compatible with the hydraulic inorganic binder and is based on anionic and hydrolysis-resistant copolymers of ethylenically unsaturated monomers, the minimum film forming temperature (MFT) of which is above the setting temperature of the concrete mixture is added to the plastic-viscous concrete mixture and mixed in the positive mixer.

The MFT of the aqueous anionic plastics dispersion is preferably between 23° and 100° C., in particular between 30° and 50° C., the glass transition temperature ($T_g$) of the anionic dispersion copolymer is preferably higher than 23° C., in particular higher than 30° C., and the anionic dispersion copolymer contains, in each case based on the dispersion copolymer, preferably 0.05 to 5% by weight, in particular 0.01 to 2.5% by weight, of monomer units from the group of ethylenically unsaturated carboxylic acids, ethylenically unsaturated sulfonic acids, ethylenically unsaturated phosphonic acids and, if appropriate, preferably up to 2% by weight, in particular 0.01 to 0.5% by weight, of monomer units from ethylenically unsaturated monomers with organosilicon radicals, which may be reactive, or contains epoxysilanes mixed with the aqueous plastics dispersion.

The amount of the anionic dispersion copolymer added in the form of aqueous dispersion is preferably 2.5 to 25% by weight, in particular 5 to 15% by weight, based on the amount of the hydraulic inorganic binder, preferably cement, in particular Portland cement, contained in the plastic-viscous concrete mixtures, the proportion of water in the aqueous plastics dispersion being taken into account as concrete mixing water. The solids content (FS) of the aqueous plastics dispersions used according to the invention is not critical. It is preferably 2 to 70% by weight, in particular 20 to 50% by weight, based on the dispersion.

The weight ratio of water to hydraulic binder, preferably the water/cement ratio (W/Z), in the finished plastic-viscous concrete mixture is preferably in the range from 0.3 to 0.4, in particular 0.34 to 0.36.

The plastics dispersions which can especially advantageously be used are the aqueous dispersions based on anionic dispersion copolymers described above as according to the invention for improving the acid corrosion resistance of concrete and the MFT of which is above the setting temperature of the concrete, preferably above 23° C., in particular between 30° and 50° C. Particularly preferred are aqueous anionic pure acrylate dispersions and aqueous anionic styrene/acrylate dispersions, as have already been described further above.

The wet concrete moldings or concrete pipe blanks produced according to the invention are dried by at least 28-day storage, preferably at normal temperature in air, during which the concrete setting is completed and the concrete hardens. Then the concrete moldings or concrete pipes obtained are subjected to the conventional properties tests or used for the intended application.

The invention is explained in greater detail by the following examples.

EXAMPLES 1 AND 2

Testing the corrosion resistance of concrete test specimens under the effect of flowing, aqueous acids or alkalis.

From isotropic concrete mixtures prepared in the laboratory from the amounts of the components listed below in a positive mixer with the additional use of plastics dispersions according to the invention with intensive mechanical mixing 1.5 cm thick concrete test slabs of the format 30×15×1.5 cm were molded by the vibration casting molding method and hardened fully by storing for 28 days under standard climatic conditions (20° C. and 65% relative atmospheric humidity). The concrete mixtures were each prepared according to the following formulation, in which PBW means parts by weight:

| | |
|---|---|
| 1600 PBW | of stream sand |
| 1200 PBW | of basalt chippings |
| 560 PBW | of cement PZ 35F |
| 112 PBW*⁾ | of aqueous plastics dispersion with 50% by weight of polymer (FS) according to Example 1 or 2 |
| 140 PBW | of water with a water/cement factor (W/Z) = 0.35 taking into account 56 kg of water from the plastics dispersion. |

*⁾ = 10% by weight of plastic calculated as FS, based on the proportion of cement.

As a comparison, in Comparative Example 1 concrete test slabs without the added dispersion plastic were prepared.

The acid or alkali resistance tests were each carried out on fully hardened solid concrete test slabs (FB). The aqueous plastics dispersions used for concrete improvement were added to the plastic-viscous concrete mixture and homogeneously mixed in in each case in such an amount that the mixture corresponded to 10% by weight of dispersion plastic, calculated as solid (FS) and based on the amount by weight of cement in the concrete mixture.

In Example 1 an aqueous plastics dispersion according to the invention based on anionic copolymers with the following composition of the latter (PBW=parts by weight) was used:

| | |
|---|---|
| 53 PBW | of styrene, |
| 42.7 PBW | of n-butyl acrylate, |
| 2 PBW | of acrylic acid and/or methacrylic acid, |
| 1.5 PBW | of ethylenically unsaturated comonomers containing sulfonic acid groups, |
| 0.8 PBW | of ethylenically unsaturated comonomers with organosilicon radicals, which may be reactive, | where the plastics dispersion contained as emulsifiers, in each case based on the anionic copolymer, additionally

| | |
|---|---|
| 0.6% by weight | of alkali metal salts of the sulfuric acid half-ester of an oxyethylated tributylphenol, and |
| 2.0% by weight | of tributylphenol polyglycol ether (with approximately 30 ethylene oxide units). |

The plastics dispersion had a solids content (FS) of 50% by weight, a pH of 8 and a low-foaming formulation. The minimum film forming temperature (MFT) of the dispersion was 32° C. and the anionic dispersion copolymer had a glass transition temperature ($T_g$) of 35° C. (determined by differential thermal analysis). For application, the dispersion was advantageously diluted to a lower solids concentration using in each case a part of the mixing water.

In Example 2 an aqueous plastics dispersion according to the invention based on anionic copolymers without organosilicon comonomer units with the following composition of the copolymers (PBW=parts by weight) was used:

| | |
|---|---|
| 56 PBW | of styrene, |
| 40.5 PBW | of n-butyl acrylate, |
| 2 PBW | of acrylic acid and/or methacrylic acid, |
| 1.5 PBW | of ethylenically unsaturated comonomers containing sulfonic acid groups, | where the plastics dispersion contained as emulsifiers, in each case based on the anionic copolymer, additionally

| | |
|---|---|
| 0.6% by weight | of alkali metal salt of the sulfuric acid half-ester of an oxyethylated nonylphenol and |
| 2.0% by weight | of nonylphenol polyglycol ether (with approximately 30 ethylene oxide units). |

The plastics dispersion had a solids content (FS) of 50% by weight, a pH of 8 and a low-foaming formulation. The minimum film forming temperature (MFT) of the dispersion was 41° C. and the anionic dispersion copolymer had a glass transition temperature ($T_g$) of 45° C. (determined by differential thermal analysis). For application, the dispersion was advantageously diluted to a lower solids concentration using in each case a part of the mixing water.

As described above, concrete test slabs of the format 30×15×1.5 cm were produced with the additional use of the plastics dispersions described above under Example 1 and Example 2 and the concrete test slabs, after hardening fully for 28 days under standard climatic conditions, were each subjected to various corrosion tests by the effect of flowing aqueous acids or alkalis. As a comparison, the concrete test slabs produced in Comparative Example 1 were tested in an analogous manner.

For corrosion testing, the concrete test slabs were each stood lengthwise at an angle of 45° to the horizontal base surface and 1500 ml of the respective aqueous test liquid to be tested for corrosiveness are dripped on uniformly below the center of the upper transverse edge of the slab at room temperature for 3 days (72 hours) so that the test liquid flowed over the slab surface in the center of the slab from top to bottom in the longitudinal direction. The tests with sodiumbicarbonate solution and with mineral water each lasted 21 days (504 hours) with in each case 10.5 l of test liquid.

Individually, 10% strength by weight aqueous solutions of the following compounds were tested:
a) Hydrochloric acid (HCl)
b) Sulfuric acid ($H_2SO_4$)
c) Nitric acid ($HNO_3$)
d) Phosphoric acid ($H_3PO_4$)
e) Lactic acid
f) Citric acid
g) Caustic soda (NaOH)
h) Sodium bicarbonate ($NaHCO_3$),
and also
i) undiluted commercial table mineral water, Neuselters brand (Neuselters Mineralquelle, Löhnberg/Selters).

All tests were repeated three times with the following result:

In tests a) to e), the concrete test slabs according to Example 1 had weak surface attacks in the form of weak roughenings. By weak roughening is meant surface erosions up to a maximum of 0.5 mm in depth. In tests f) to i), neither surface attacks nor roughenings but slight discolorations of the concrete surfaces were found.

In tests a) to e) the concrete test slabs according to Example 2 had slight surface attacks in the form of weak roughenings which, however, were somewhat stronger than in Example 1. In tests f) to i), neither surface attacks nor roughenings but slight discolorations of the concrete surface were found.

COMPARATIVE EXAMPLE 1

The experiments described in Examples 1 and 2 were repeated with the modification that, in the formulation for the concrete mixture for producing the concrete test slabs, the plastics dispersion was left out and the W/Z value was obtained by increasing the proportion of water accordingly.

The corrosion tests on the plastics dispersion-free concrete test slabs were carried out as described in Examples 1 and 2 and the following result obtained:

In tests a) to f), the concrete test slabs had very severe surface destruction with corrosion in parts up to 8 mm deep. In test h), there were symptoms of etching at the wetting boundaries. In test g) no surface attacks but severe discolorations of the concrete surface were found. In test i) no surface attacks but slight discolorations of the concrete surface were found.

EXAMPLES 3a, 3b, 4a AND 4b

By known methods using machines, both by the vibration pressing process and the roller pressing process, unreinforced concrete pipes of, in each case, 2.5 m installed length, 0.3 m internal diameter and 6 cm wall thickness were produced from plastic-viscous concrete mixtures which had been prepared in a positive mixer with the additional use of aqueous plastics dispersions according to the invention, and their properties determined after fully hardening for 28 days the stripped concrete pipe blanks. The full hardening took place under normal practical operating conditions, at first during the first night in the production hall and subsequently outdoors on a storage site.

The plastic-viscous concrete mixtures used for molding the pipes and prepared in a positive mixer were each prepared according to the following concrete pipe formulation:

For 1 $m^3$ of flowable, processable concrete mixture (=2500 kg) the amounts of components listed below were in each case used and mixed together homogeneously in a conventional positive mixer (planetary mixer), subsequently poured into conventional concrete pipe molds using machines and simultaneously compacted mechanically, i.e., in the case of the vibration pressing process, pressed by intensive mechanical vibration and, after completion of the filling and compacting process, the pipe molds removed and the wet concrete pipe blanks immediately transported away for storage and dried and allowed to harden over 28 days:

|  |  |  |
|---|---|---|
|  | 350 kg | of cement PZ 45 F |
|  | 70 kg*) |  |
| or | 105 kg**) | of aqueous plastics dispersion with 50% by weight of polymer (FS) according to Example 1 or 2 |
|  | 87.5 kg*) |  |
| or | 70 kg**) | of water with W/Z = 0.35 taking into account 35 kg*) or 52.5 kg**) respectively of water from the plastics dispersion |
|  | 1992.5 kg*) |  |
| or | 1975 kg**) | of aggregates (water-free) according to DIN 4032. |

*) = 10% by weight of plastic calculated as FS, based on the proportion of cement
**) = 15% by weight of plastic calculated as FS, based on the proportion of cement.

For producing reinforced concrete pipes, substantially the same concrete formulation was used, with the modification that the procedure was carried out according to DIN 4035 instead of according to DIN 4032.

In Examples 3a and 3b the aqueous plastics dispersion according to the invention used and described in Example 1, in a quantity of 10% by weight of plastic, calculated as FS and based on the proportion of cement (=Example 3a), and in an amount of 15% by weight of plastic, calculated as FS and based on the proportion of cement (=Example 3b), was used according to the preceding concrete pipe formulation to produce unreinforced standard socket concrete pipes of 2.5 m installed length, 0.3 m clear width and 6 cm wall thickness by the vibration pressing process.

In Examples 4a and 4b, the aqueous plastics dispersion according to the invention used and described in Example 2, in an amount of 10% by weight of plastic, calculated as FS and based on the proportion of cement (=Example 4a), and in an amount of 15% by weight of plastic, calculated as FS and based on the proportion of cement (=Example 4b), was used according to the preceding concrete pipe formulation to produce unreinforced standard socket concrete pipes of 2.5 m installed length, 0.3 m clear width and 6 cm wall thickness by the roller pressing process.

COMPARATIVE EXAMPLES 2 AND 3

As a comparison, in Comparative Examples 2 and 3 in each case unreinforced standard socket concrete pipes of 2.5 m installed length, 0.3 m clear width and 6 cm wall thickness were produced by the vibration pressing process (=Comparative Example 2) and by the roller pressing process (=Comparative Example 3), in each case with the preceding concrete pipe formulation with the modification that the plastics dispersion was left out and the W/Z value was achieved by a corresponding increase in the proportion of water. The result of this was in both cases that the plastic-viscous concrete mixture, during filling with machines into the concrete pipe molds with simultaneous mechanical compacting, has only a small thixotropic behavior and a relatively large air pore volume in comparison to the concrete mixtures of Examples 3a and 3b and 4a and 4b, which had a distinct thixotropic behavior during filling with machines into the concrete pipe molds.

The corrosion tests on the concrete pipes were carried out analogously to Examples 1 and 2 and to Comparative Example 1 with acidic test liquids. The concrete test slabs used were cut out of the dried and fully hardened concrete pipes to the required size in each case using cutting disks and had a convex shape, by contrast with the flat test slabs from Examples 1 and 2 and Comparative Example 1.

As acidic test liquids, individually in each case 10% strength by weight aqueous solutions of the following compounds were tested:
a) Sulfuric acid ($H_2SO_4$)
b) Nitric acid ($HNO_3$)
c) Lactic acid
d) Citric acid.

All tests were repeated three times with the following result:

The concrete pipe test slabs according to Examples 3a and 4a were found in the tests a) to have low surface attacks in the form of weak roughenings and in the tests b), c) and d) to have relatively severe surface roughenings.

The concrete pipe test slabs according to Examples 3b and 4b were found in the tests a) and c) to have slight surface attacks in the form of weak roughenings and in the tests b) and d) to have relatively severe surface roughenings.

The concrete pipe test slabs according to Comparative Examples 2 and 3 were found in the tests a) to d) to have severe surface damage with up to 8 mm deep corrosions in the tests a) and c), with 20 to 30 mm deep corrosions in the tests b) and with 5 to 15 mm deep corrosions in the tests d).

Because of the thixotropic behavior of the plastic-viscous concrete mixtures of the Examples 3a, 3b, 4a and 4b according to the invention, it was possible to keep the machine cycle times until stripping of the wet concrete pipe blanks, which in comparison to the pipes obtained according to Comparative Examples 2 and 3 have much smoother and also denser surface structures, very short.

The steel-reinforced concrete pipes (according to DIN 4035) according to the invention also produced analogously to the Examples 3a, 3b, 4a and 4b according to the invention were found as a result of their reduced $CO_2$ permeability and their substantially improved concrete elasticity to have an unexpectedly good long-term corrosion protection effect on the steel reinforcement, since the concrete had practically no hair cracks after storage for several months with frequent cyclic temperature loading, in comparison to the steel-reinforced concrete pipes not according to the invention, which were produced analogously to Comparative Examples 2 and 3 and on which possibly corrosive liquids penetrate into the concrete interior and can lead to corrosion of the reinforcement, which it was possible to observe with the appropriate test specimens to various extents after only a short time, in particular after frequent cyclic temperature loading within the seasonally determined temperature range.

The testing of further application properties on unreinforced concrete pipe test specimens of Examples 3a, 3b, 4a and 4b according to the invention, by comparison with unreinforced concrete pipe test specimens of Comparative Examples 2 and 3, resulted for the concrete pipe test specimens according to the invention in a significantly increased crushing load (test according to DIN 4032, paragraph 8.3.1.1), a significantly improved ring tensile strength in bending (test according to DIN 4032, paragraph 8.3.1.2), a significantly lower modulus of elasticity (test according to DIN 1048), a significantly increased elongation at break, determined using centric tensile tests, and a considerably increased water impermeability (test according to DIN 1048, paragraph 4.7).

I claim:

1. A molded unreinforced or reinforced concrete molding, which may also be a concrete pipe, bound by hydraulic inorganic binders, with improved corrosion resistance to acids and acidic sewage, improved penetration resistance to inorganic and organic liquids and gases and improved mechanical stability, which has been produced by molding and hardening at normal temperature in air or below of plastic-viscous concrete mixtures of hydraulic inorganic binders, which may comprise cement or contain cement, aggregates and water, which additionally contains finely distributed plastics components from anionic dispersion copolymers which have been prepared from ethylenically unsaturated monomers by copolymerization, are hydrolysis resistant with respect to the hydraulic inorganic binder and with respect to acidic sewage and have been mixed with the plastic-viscous concrete mixtures as an aqueous plastics dispersion which is compatible with the hydraulic inorganic binder and whose minimum film forming temperature (MFT) is above the hardening temperature of the plastic-viscous concrete mixtures; the glass transition temperature ($T_g$) of the anionic dispersion copolymer is higher than 23° C., and the anionic dispersion copolymer contains, in each case based on the dispersion copolymer, 0.05 to 5% by weight of monomer units from selected the group consisting of ethylenically unsaturated carboxylic acids, ethylenically unsaturated sulfonic acids, ethylenically unsaturated phosphonic acids and, optionally, up to 2% by weight of monomer units from ethylenically unsaturated monomers with organosilicon radicals, which may be reactive, or contains epoxysilanes mixed with the aqueous plastics dispersion.

2. A concrete molding as claimed in claim 1, wherein the content of anionic dispersion copolymers is 2.5 to 25% by weight, calculated as solid (FS) and based on the content of hydraulic inorganic binders in the concrete molding.

3. A concrete molding as claimed in claim 1, which contains at least one anionic dispersion copolymer selected from the group consisting of (meth)acrylate copolymers, styrene and α-methylstyrene/(meth)acrylate copolymers.

4. A process for producing unreinforced or reinforced concrete moldings, which may also be concrete pipes, as claimed in claim 1 from aqueous moldable concrete mixtures containing conventional hydraulic inorganic binders, which may comprise cement or contain cement, and conventional, inorganic aggregates with the production of plastic-viscous concrete mixtures in a positive mixer, shaping of the concrete moldings, which may take place by means of press molding machines or extrusion machines, and the concrete pipes, which may take place in a concrete pipe pressing machine, and allowing the concrete to harden after stripping the wet concrete moldings or concrete pipe blanks, wherein an effective amount of an aqueous plastics dispersion which is compatible with the hydraulic inorganic binder and is based on anionic and hydrolysis-resistant copolymers of ethylenically unsaturated monomers, the minimum film forming temperature (MFT) of which is above the setting temperature of the concrete mixture is added to the plastic-viscous concrete mixture and mixed in the positive mixer.

5. The process as claimed in claim 4, wherein the minimum film forming temperature (MFT) of the aqueous anionic plastics dispersion is between 23° and 100° C. the glass transition temperature ($T_g$) of the anionic dispersion copolymer is higher than 23° C., and the anionic dispersion copolymer contains, in each case based on the dispersion copolymer, 0.05 to 5% by weight, of monomer units from the group of ethylenically unsaturated carboxylic acids, ethylenically unsaturated sulfonic acids, ethylenically unsaturated phosphonic acids and, optionally, up to 2% by weight of monomer units from ethylenically unsaturated monomers with organosilicon radicals, which may be reactive, or epoxysilanes mixed with the aqueous plastics dispersion, and the solids content (FS) of the plastics dispersion is 2 to 70% by weight, based on the dispersion.

6. The process as claimed in claim 4, wherein the aqueous anionic plastics dispersion contains anionic dispersion copolymers based on (meth)acrylate copolymers or on styrene or α-methylstyrene/(meth)acrylate copolymers.

7. The process as claimed in claim 4, wherein the weight ratio of water to hydraulic binder, or the water/cement ratio (W/Z), in the finished plastic-viscous concrete mixture is in the range from 0.3 to 0.4, the proportion of water in the aqueous plastics dispersion being taken into account in the entire amount of the mixing water.

8. A molded unreinforced or reinforced concrete molding, which may also be a concrete pipe, bound by hydraulic inorganic binders, with improved corrosion resistance to acids and acidic sewage, improved penetration resistance to inorganic and organic liquids and gases and improved mechanical stability which has been produced by molding and hardening at 20° C. of plastic-viscous concrete mixtures of hydraulic inorganic binders, which may comprise cement or contain cement, aggregates and water, which additionally contains finely distributed plastics components from anionic dispersion copolymers which have been prepared from ethylenically unsaturated monomers by copolymerization, are hydrolysis resistant with respect to the hydraulic inorganic binder and with respect to acidic sewage and have been mixed with the plastic-viscous concrete mixtures as an aqueous plastics dispersion which is compatible with the hydraulic inorganic binder and whose minimum film forming temperature (MFT) is above the hardening temperature of the plastic-viscous concrete mixtures; the glass transition temperature (Tg) of the anionic dispersion copolymer is higher than 23° C., and the anionic dispersion copolymer contains, in each case based on the dispersion copolymer, 0.05 to 5% by weight of monomer units selected from the group consisting of ethylenically unsaturated carboxylic acids, ethylenically unsaturated sulfonic acids, ethylenically unsaturated phosphonic acids and, optionally up to 2% by weight of monomer units from ethylenically unsaturated monomers with organo-silicon radicals, which may be reactive, or contains epoxysilanes mixed with the aqueous plastics dispersion.

* * * * *